(«12») United States Patent
LeBlanc et al.

(10) Patent No.: US 7,818,625 B2
(45) Date of Patent: Oct. 19, 2010

(54) TECHNIQUES FOR PERFORMING MEMORY DIAGNOSTICS

(75) Inventors: David C. LeBlanc, Monroe, WA (US); Steven M. Greenberg, Seattle, WA (US); Thomas S. Coon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 999 days.

(21) Appl. No.: 11/206,386

(22) Filed: Aug. 17, 2005

(65) Prior Publication Data

US 2007/0043974 A1 Feb. 22, 2007

(51) Int. Cl.
*G06F 11/00* (2006.01)
(52) U.S. Cl. ................................ 714/40; 714/42
(58) Field of Classification Search ............... 714/42, 714/40
See application file for complete search history.

(56) References Cited

U.S. PATENT DOCUMENTS

| | | | | |
|---|---|---|---|---|
| 3,838,260 | A * | 9/1974 | Nelson | 714/25 |
| 4,943,966 | A * | 7/1990 | Giunta et al. | 714/5 |
| 5,179,695 | A * | 1/1993 | Derr et al. | 714/31 |
| 5,623,636 | A * | 4/1997 | Revilla et al. | 711/163 |
| 6,035,420 | A * | 3/2000 | Liu et al. | 714/25 |
| 6,185,138 | B1 | 2/2001 | Brady | |
| 6,308,243 | B1 * | 10/2001 | Kido | 711/147 |
| 6,457,142 | B1 * | 9/2002 | Klemm et al. | 714/38 |
| 6,487,465 | B1 * | 11/2002 | Dayan et al. | 700/81 |
| 6,487,623 | B1 * | 11/2002 | Emerson et al. | 710/302 |
| 6,567,940 | B1 | 5/2003 | Kroon | |
| 6,779,141 | B1 | 8/2004 | Pendurkar | |
| 7,406,399 | B2 * | 7/2008 | Furem et al. | 702/182 |
| 2002/0149980 | A1 | 10/2002 | Wu et al. | |
| 2003/0154428 | A1 | 8/2003 | Pelner | |
| 2003/0220923 | A1 * | 11/2003 | Curran et al. | 707/8 |
| 2004/0153793 | A1 * | 8/2004 | Jarboe et al. | 714/27 |
| 2005/0041460 | A1 | 2/2005 | Vinke et al. | |
| 2005/0060514 | A1 * | 3/2005 | Pomaranski et al. | 711/202 |
| 2005/0120284 | A1 | 6/2005 | Ouellette et al. | |
| 2005/0182969 | A1 * | 8/2005 | Ginter et al. | 713/201 |
| 2006/0085838 | A1 * | 4/2006 | Samuelsson et al. | 726/1 |

FOREIGN PATENT DOCUMENTS

GB 1459851 12/1976
WO 0101422 A1 1/2001

OTHER PUBLICATIONS

"Magellass.com; MemMonster", Retrieved at<<http://www.magellass.com/ram_memory.html>>, last viewed on Jul. 13, 2009, 2 pages.
"Benutec Software; RamCleaner; BOOST Your Computer's Speed & Stability", Retrieved at<<http://www.benutec.com/ramcleaner>>, last viewed on Jul. 13, 2009, 2 pages.
"(RST Pro2) RAM Stress Test Professional 2", Retrieved at<<http://www.uxd.com/rstpro2.shtml>>, last viewed on Jul. 10, 2009, pp. 2.

* cited by examiner

*Primary Examiner*—Scott T Baderman
*Assistant Examiner*—Kamini Patel

(57) ABSTRACT

Techniques are provided for performing memory diagnostics. A portion of physical memory is locked using functionality included in an operating system. At least one memory diagnostic test is executed on the portion producing a result. It is determined, in accordance with the result, whether a memory problem exists for the portion of physical memory.

18 Claims, 12 Drawing Sheets

TECHNIQUES FOR PERFORMING MEMORY DIAGNOSTICS

BACKGROUND

Computer systems may include a variety of hardware and software components. Hardware components may include, for example, different forms of memory, data storage devices, and the like. One or more hardware components, such as memory components including, for example, random access memory (RAM), may include or develop defects. One technique that may be used in connection with determining problems with memory includes performing memory diagnostics. Memory diagnostics may include execution of a variety of different tests to assess the health of one or more memory components.

Existing memory diagnostic techniques may have one or more drawbacks. In order to execute memory diagnostics on a computer system, the computer system may be required to be rebooted so that any ongoing tasks, such as may be performed by an executing application, are interrupted. A user may have to modify settings so that the computer system boots up from a particular device using a special boot disk which may vary from the typical boot sequence. Additionally, while the memory diagnostics are executing, the computer system may be unavailable for performing other tasks and operations. The memory diagnostics may also take an undesirable amount of time to complete. Furthermore, the results of the memory diagnostics may not be in a form understood easily by users with varying skill levels.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are techniques for performing memory diagnostics. In accordance with one aspect of the techniques described herein, a portion of physical memory is locked using functionality included in an operating system. At least one memory diagnostic test on the portion is executed producing a result. In accordance with the result, it is determined whether a memory problem exists for the portion.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
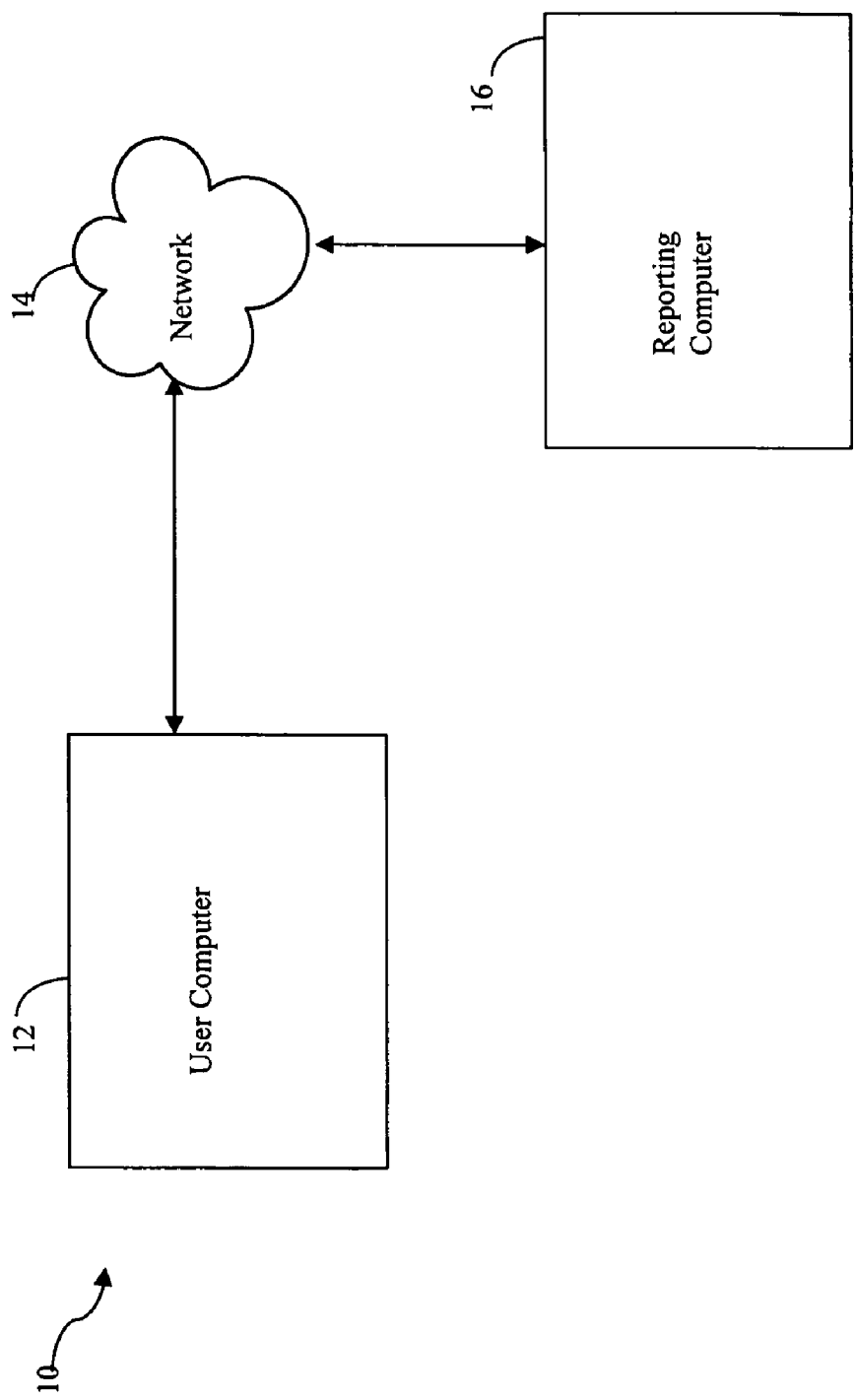
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 is a user computer 12, a network 14 and a reporting computer 16. The user computer 12 may include a standard, commercially-available computer or a special-purpose computer that may be used to execute one or more program modules. Program modules that may be executed by the user computer 12 in connection with performing memory diagnostics are described elsewhere herein in more detail. The user computer 12 may operate in a networked environment and communicate with a reporting computer 16.

In connection with the techniques described herein, the user computer 12 may send and/or receive data in connection with performing memory diagnostics. For example, the user computer 12 may report results in connection with the memory diagnostics to the reporting computer 16. The user computer 12 may also utilize, as input, data from the reporting computer 16 in connection with performing memory diagnostics as will be described in more detail herein.

It will be appreciated by those skilled in the art that although the user computer is shown in the example as communicating in a networked environment, the user computer 12 may communicate with other components utilizing different communication mediums. For example, the user computer 12 may communicate with one or more components utilizing a network connection, and/or other type of link known in the art including, but not limited to, the Internet, an intranet, or other wireless and/or hardwired connection(s).

Figure 2:
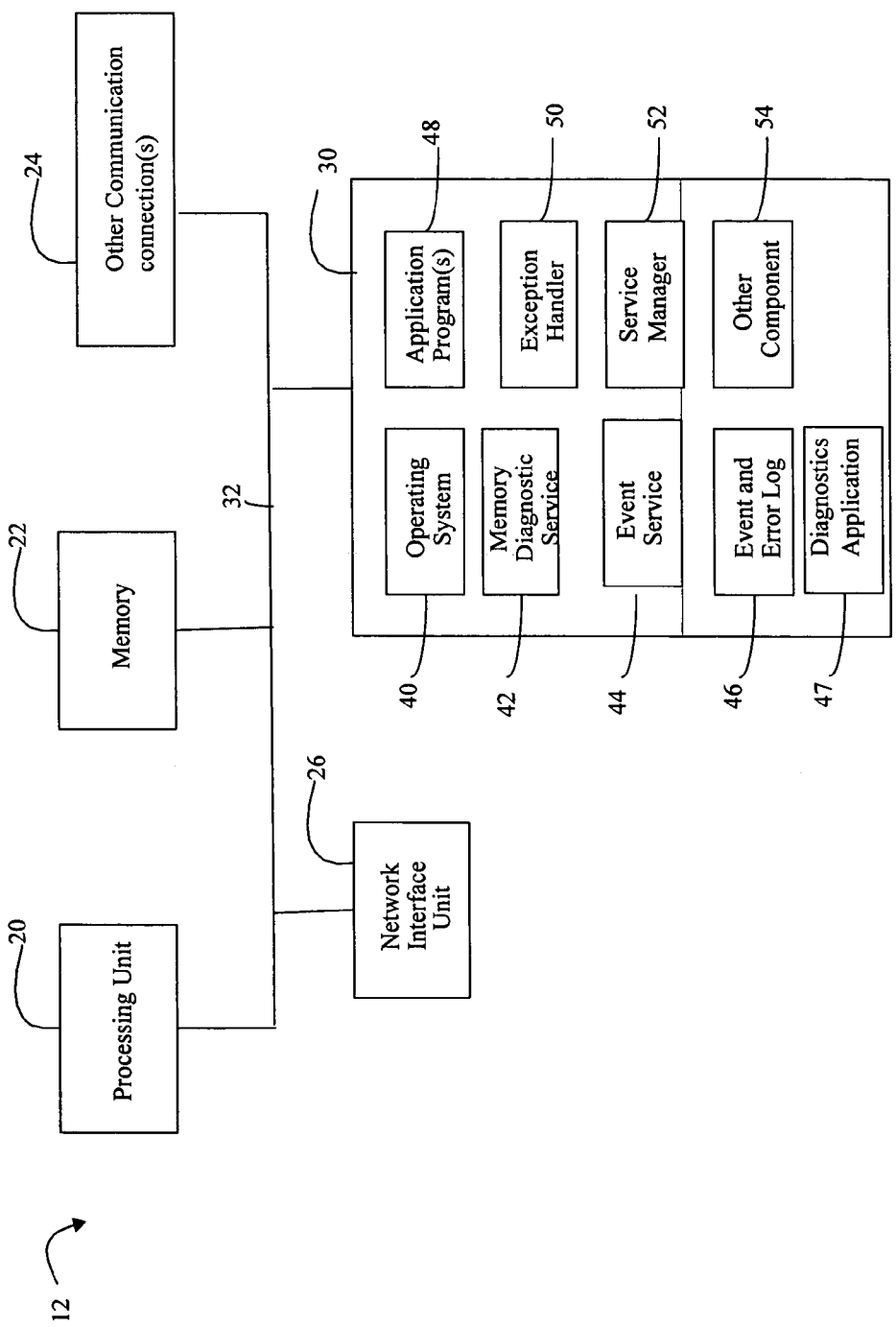
FIG. 2 is an example of components that may be included in an embodiment of a user computer for use in connection with performing the techniques described herein.

Referring now to FIG. 2, shown is an example of components that may be included in a user computer 12 as may be used in connection with performing the various embodiments of the techniques described herein. The user computer 12 may include one or more processing units 20, memory 22, a network interface unit 26, storage 30, one or more other communication connections 24, and a system bus 32 used to facilitate communications between the components of the computer 12.

Depending on the configuration and type of user computer 12, memory 22 may be volatile (such as RAM), non-volatile (such as ROM, flash memory, etc.) or some combination of the two. Additionally, the user computer 12 may also have additional features/functionality. For example, the user computer 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the user computer 12. The storage 30 in one embodiment may be a mass-storage device with associated computer-readable media providing non-volatile storage for the user computer 12. Although the description of computer-readable media as illustrated in this example may refer to a mass storage device, such as a hard disk or CD-ROM drive, it will be appreciated by those skilled in the art that the computer-readable media can be any available media that can be accessed by the user computer 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by user computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The user computer 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the user computer 12 may operate in a networked environment as illustrated in FIG. 1 using logical connections to remote computers through a network. The user computer 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the user computer 12, one or more of these elements included in the storage 30 may also reside in a portion of memory 22, such as, for example, RAM for controlling the operation of the user computer 12. The example of FIG. 2 illustrates various components including an operating system 40, a memory diagnostic service 42, an event service 44, an event and error log 46, one or more application programs 48, an exception handler 50, a service manager 52, a diagnostic application 47, and other components 54. The operating system 40 may be any one of a variety of commercially available or proprietary operating system. The operating system 40, for example, may be loaded into memory in connection with controlling operation of the user computer. One or more application programs 48 may execute in the user computer 12 in connection with performing user tasks and operations.

The service manager 52 may be used in connection with managing services. It should be noted that although a service manager is described herein as utilized in connection with management of services, other embodiments may include an operating system which manages services using other techniques. Services may be characterized as applications that run outside of a user context. Examples of such services as may be managed by the service manager 52 include the event service 44 and the memory diagnostic service 42. The event service 44 may be used in connection with logging events such as, for example, security-related events, system-related events, and/or application events. In one embodiment as will be described in more detail below, events in connection with application programs 48, such as application execution and failures, may be recorded in an event and error log 46. In one embodiment, a session entry may be created in the log 46 each time an application is executed. The session entry may include information about the program and data regarding the termination status of the program. The data regarding the termination status may indicate whether the program terminated normally or abnormally, such as, for example, in connection with a program crash, program hang (e.g., where program continues executing but appears unresponsive to a user), or any other type of abnormal termination (e.g., if power to the computer was turned off while executing a program).

Data from the event and error log 46, such as the session entry information, may be communicated to the reporting computer 16. The reporting computer 16 may, for example, track historical execution information of applications executed on the user computer 12 and possibly other computers connected to the reporting computer 16. The data of 46 may be sent to the reporting computer 16, for example, after execution of memory diagnostics as described herein if so instructed by a user on the user computer 12. The data from the log 46, such as the session entry information regarding program termination, may be used in connection with conditionally performing one or more diagnostic services such as memory diagnostics performed using the memory diagnostic service 42. The memory diagnostic service 42 may be used to execute tests to assess the health of one or more components of memory 22, such as RAM, that may be included in the user computer 12.

An exception handler 50 may operate in connection with handling exceptions as may occur during operation of an application program. As will be described herein in one embodiment, the exception handler 50 may be utilized in connection with performing memory diagnostics, as by the memory diagnostic service 42. In accordance with one or more conditions as may occur as described in more detail in following paragraphs, the exception handler may invoke the diagnostics application 47. In one embodiment, the diagnostics application 47 may be conditionally executed by the exception handler in accordance with criteria to identify and/or repair problems with the user computer 12. The diagnostic application 47 may cause execution of the memory diagnostic service 42 as one of the diagnostics performed in connection with problems experienced by the user computer 12. It will be appreciated by those skilled in the art that the user computer 12 may also include one or more other components 54 as may vary with an embodiment.

It should be noted that use of the term "memory" herein, for example, with reference to memory 22 of FIG. 2 and memory diagnostics, is with respect to physical memory as distinguished from virtual memory as may exist in a computing environment. The memory diagnostics and testing, locking, and other functions as described in connection with the techniques herein are performed with respect to physical memory.

It should be noted that although components illustrated herein, such as the event and error log 46, are shown in FIG. 2 as a single logical element, multiple logs may be utilized in an embodiment. For example, an embodiment may include one or more event logs and one or more error logs.

What will now be described are illustrative embodiments in which the memory diagnostic processing and techniques described herein may be invoked.

Figure 3:
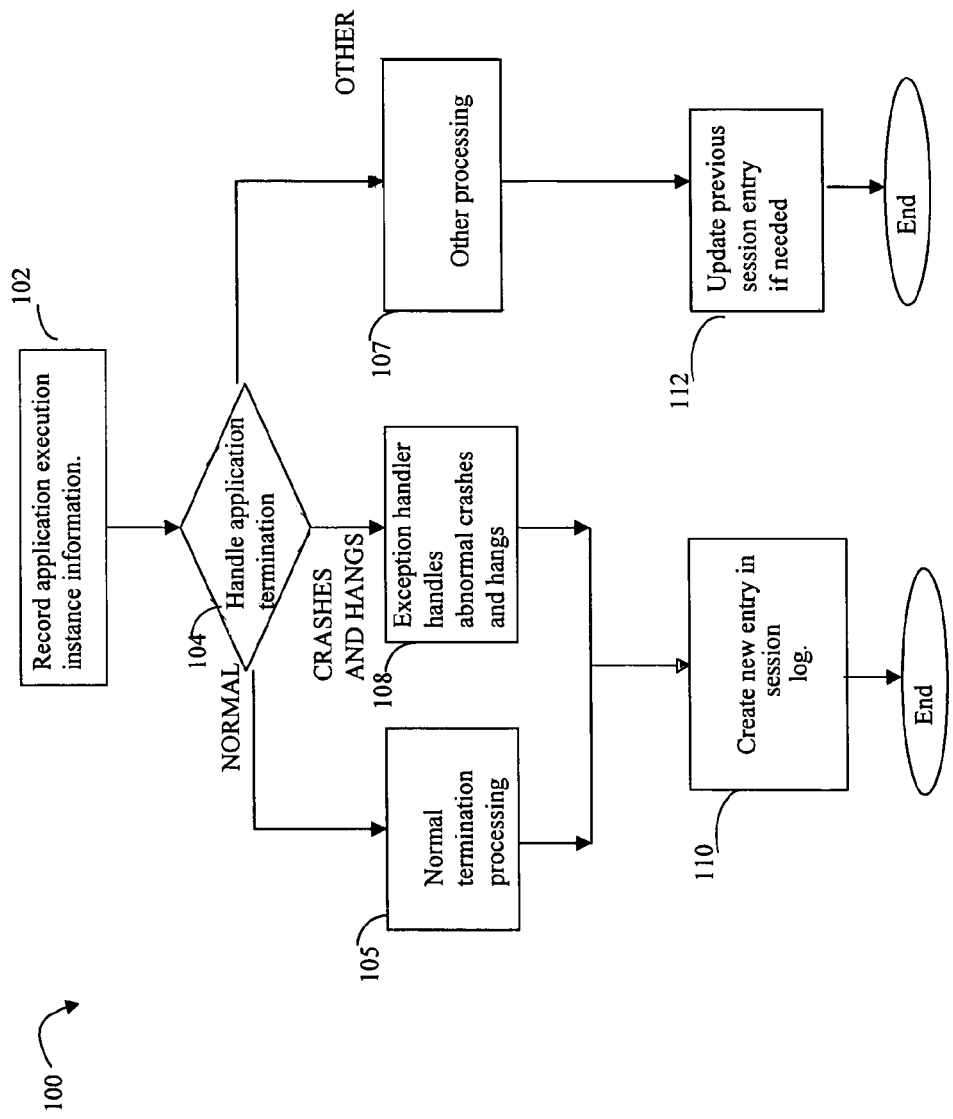
FIG. 3 is a flowchart of processing steps of one embodiment that may be executed in connection with the techniques described herein for performing memory diagnostics.

Referring now to FIG. 3, shown is a flowchart of processing steps of one embodiment that may be executed by the user computer 12 in connection with the techniques described herein for performing memory diagnostics. The processing steps of flowchart 100 may be executed in connection with each instance of an application program. In other words, each time an application program is executed, the processing steps of 100 may be performed. The steps of flowchart 100 may be performed by the event service 44 for creating event records as may be included in the event and error log 46. At step 102, information about the particular execution instance may be recorded. Such information may include, for example, the name of the application being executed, and the like. The information recorded in step 102 may be used in connection with creating a session entry in the event log for this application execution instance. As part of the processing performed when the application execution terminates, step 104 handles application termination conditions. The application may terminate normally and normal termination process of step 105 may be performed. Normal termination may include termination, for example, in response to a user request, or when the application program successfully completed execution of a task or operation. Control proceeds to step 110 to create a new entry in the event log for the current application execution instance. The application may terminate abnormally and processing of step 108 may be performed where an unfiltered exception handler may log program execution status. Additional details about processing steps that may be performed by an embodiment of the exception handler are illustrated in connection with FIG. 4. Control then proceeds to step 110. In the event that another termination condition exists, such as when there is an abnormal termination that is not handled by the exception handler in step 108, step 107 may be performed. One such condition resulting in execution of step 107 may occur, for example, when the power to the computer system is cut. On a next system reboot, application terminations from a previous session not handled by step 105 or step 108 are examined. On the next system reboot, processing of step 112 is performed for any such terminations from a previous session, and the corresponding previous entries in the session log are updated or created if needed.

Figure 4:
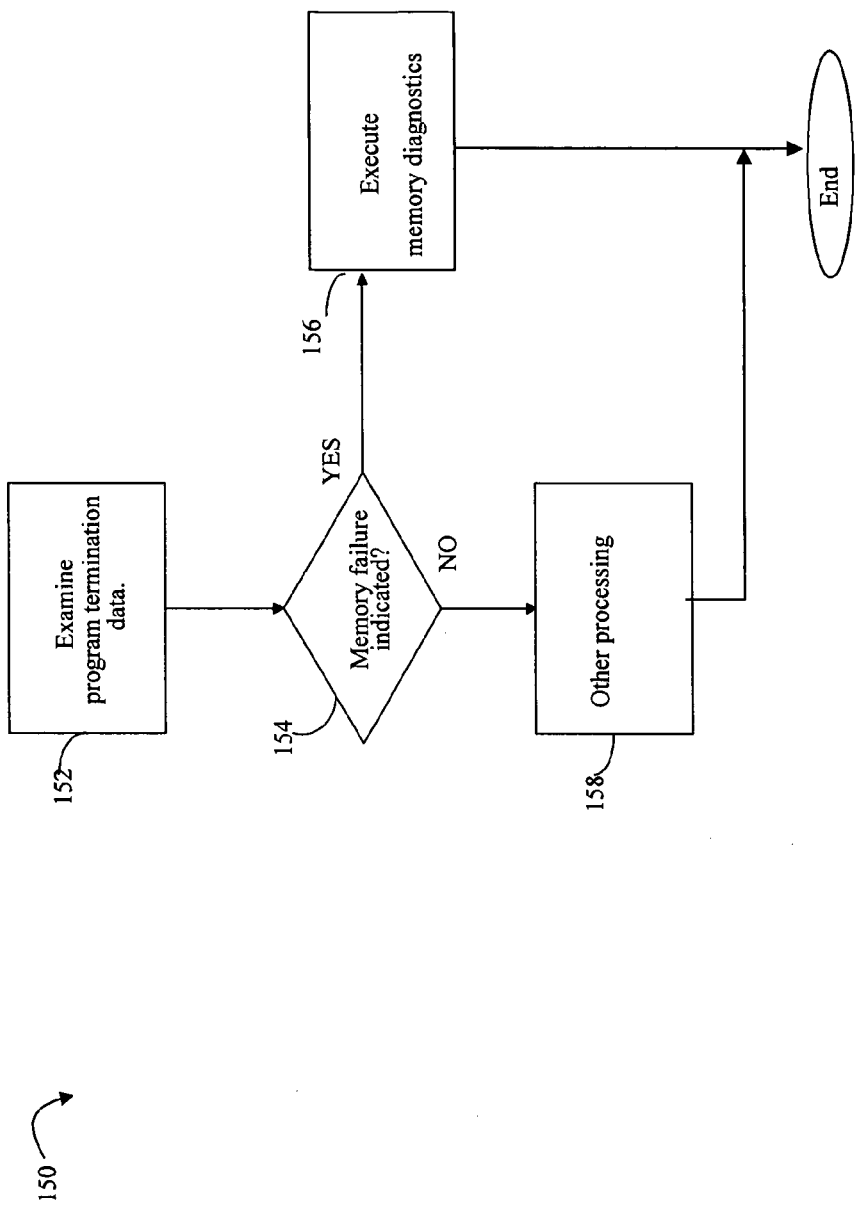
FIG. 4 is a flowchart of processing steps that may be performed by an exception handler included in an embodiment.

Referring now to FIG. 4, shown is a flowchart of processing steps that may be performed by an embodiment of an exception handler. As described above, the processing steps of flowchart 150 of FIG. 4 may be executed as part of step 108 processing. As described herein, such abnormal termination status may be the result of one or more problems, hardware and/or software, with the user computer upon which the application program was executing. As such, the exception handler may conditionally perform memory diagnostic processing in accordance with program termination data associated with the current application termination, previous termination data associated with other application execution instances for the user computer, and/or other information that may vary with each embodiment. As will be appreciated by those skilled in the art, the exception handler that performs processing of flowchart 150 of FIG. 4 may also handle processing in connection with exceptions other than as described herein. At step 152, the program termination data may be examined. At step 154, a determination is made as to whether this data, alone or in conjunction with other data, may indicate a memory failure such as, for example, a problem with a portion of RAM of the user computer 12. If so, control proceeds to step 156 for processing to execute memory diagnostics, as will be described in more detail elsewhere herein. In one embodiment, the execution of memory diagnostics may be performed by invocation of a diagnostic application. Processing that may be performed by an embodiment of the diagnostic application invoked at step 156 is described in more detail in connection with FIG. 7. Otherwise, if step 154 determines that no memory diagnostic processing is warranted, control proceeds to step 158 for other processing.

The data examined in order to determine whether to perform step 156 processing may vary with an embodiment. For example, an embodiment may examine termination data associated with the current application's execution, alone or in combination with other termination data of previous application executions for the user computer, to determine whether the behavior is symptomatic of errors that may indicate memory failures. In other words, based on the data set examined, a determination may be made in accordance with a defined profile of one or more characteristics indicative of a possible memory failure. The profile may include characteristics associated with, for example, program crashes, program hangs, other undesirable termination behavior errors indicative of corrupt binary files, hardware failures, and the like. Existence of one or more of these characteristics are one type of heuristic that may be used to conditionally trigger execution of memory diagnostic processing of step 156. The heuristics used to indicate possible memory failure may be based on empirical knowledge of a particular system. Other heuristics may also be used in addition to the foregoing. Such heuristics may include one or more threshold values used in combination with the characteristics included in the defined profile used in connection with termination data. For example, an embodiment may examine termination data associated with a number of prior application executions. The profile data may be used to look for certain types of errors included in the termination data. Additionally, a threshold occurrence rate may be used. In the event that there is an actual occurrence rate in the termination data which meets a threshold level of one or more known conditions typically associated with a memory failure, the memory diagnostic processing of step 156 may be triggered. As will be described in more detail in following paragraphs, step 156 processing may be performed by invoking a diagnostic application to perform one or more diagnostics as may be included in an embodiment.

It should be noted that data associated with abnormal program termination may also be communicated to the remote reporting computer 16 of FIG. 1 after execution of memory diagnostics as described herein. The reporting computer 16 may store historical abnormal program termination data from the user computer 12, and possibly other computers connected to the reporting computer 16. Heuristics, such as one or more thresholds as may be used in an embodiment, may be obtained locally from the user computer 12 or obtained from the reporting computer 16. In one embodiment, the heuristics including one or more thresholds may be periodically downloaded from the reporting computer 16 to the user computer 12.

In connection with this embodiment and others as described herein, the memory diagnostic processing may be one of multiple diagnostic processing operations performed using automated and/or manual invocation techniques. In connection with automated invocation techniques for executing memory and/or other diagnostics, one or more environment or configuration parameters may be set to indicate whether a particular diagnostic, such as memory diagnostic processing, is to be performed. Such performance may be done conditionally upon the occurrence of certain conditions as described above in accordance with one or more heuristics. Additionally, the values for one or more thresholds as may be used in connection with the heuristics described above may also be indicated as environment or configuration parameters.

The memory diagnostic processing described elsewhere herein may also be invoked as a result of other processing than as illustrated in connection with FIGS. 3 and 4.

Figure 5:
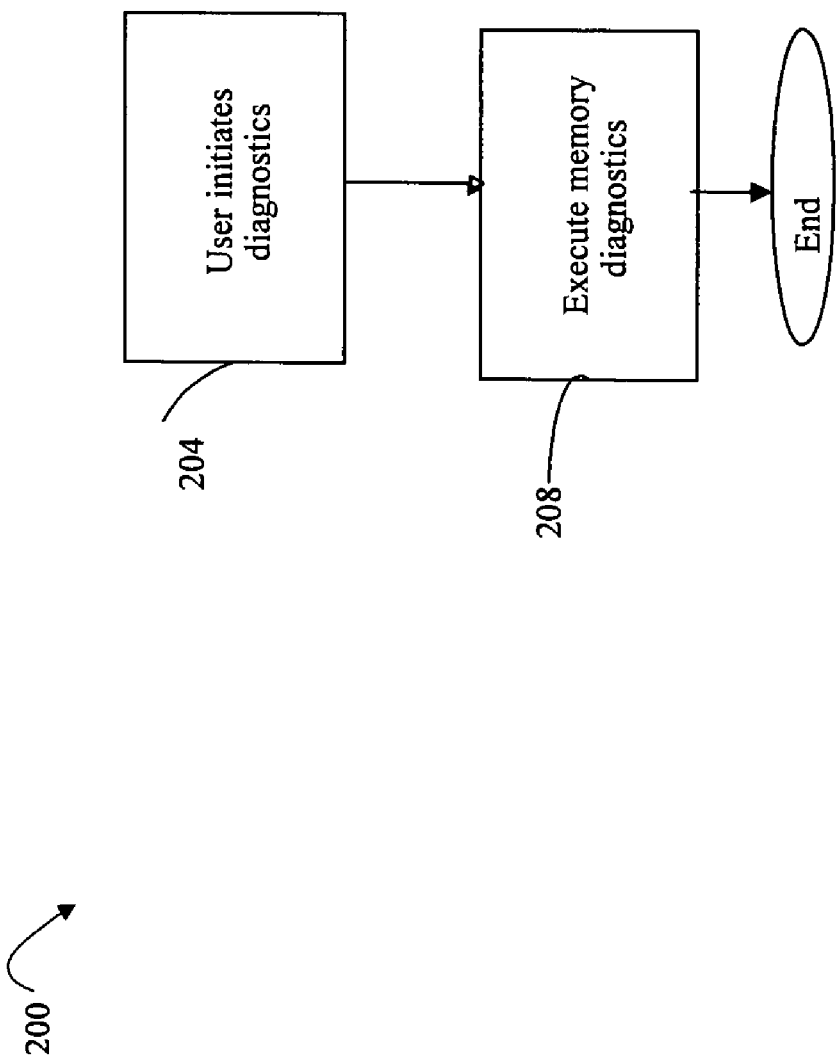
FIG. 5 is a flowchart of processing steps of a second embodiment that may be executed in connection with the techniques described herein for performing memory diagnostics.

Referring now to FIG. 5, shown is a flowchart of processing steps of a second embodiment that may be executed by the user computer 12 in connection with the techniques described herein for performing memory diagnostics. At step 204, a user may manually launch or initiate execution of the memory diagnostics. The user may, for example, invoke execution of the diagnostic application through a user interface. At step 208, the memory diagnostic processing may be performed as a result of this invocation.

Figure 6:
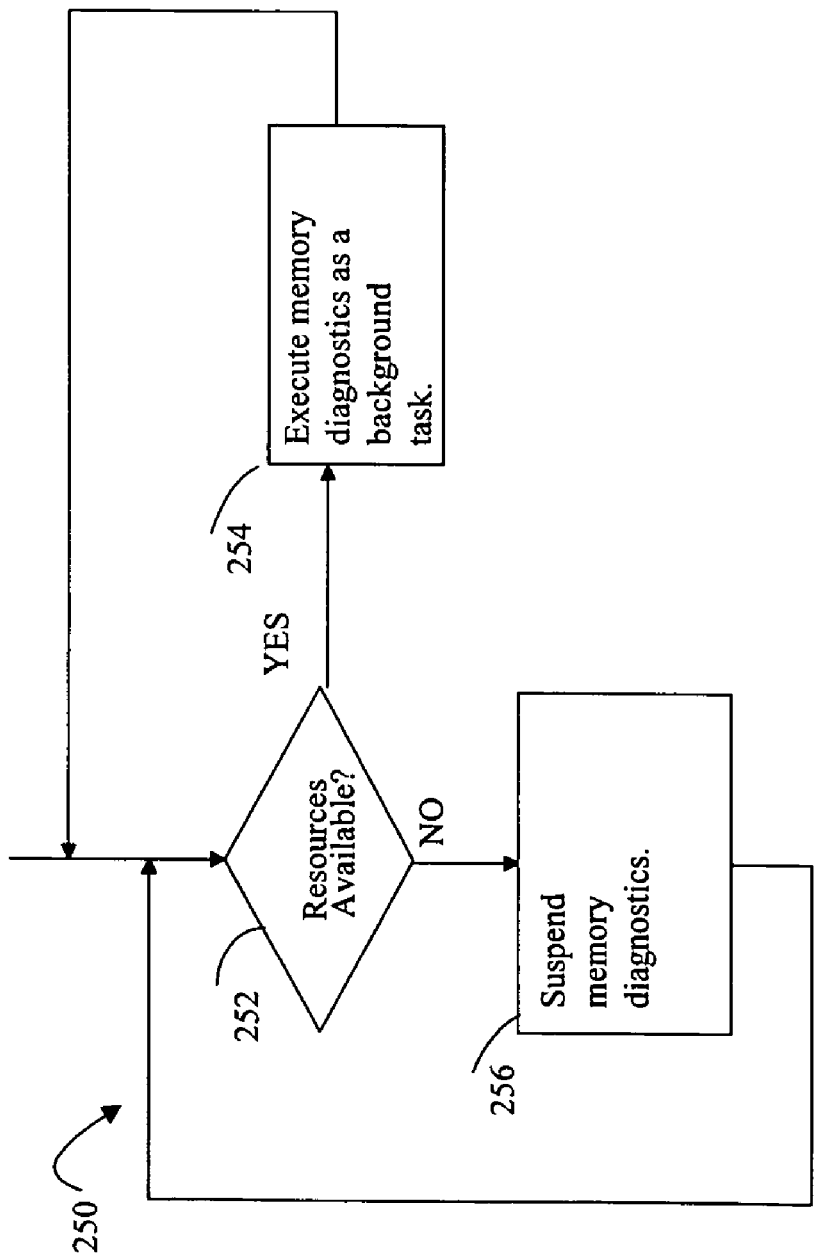
FIG. 6 is a flowchart of processing steps of a third embodiment that may be executed in connection with the techniques described herein for performing memory diagnostics.

Referring now to FIG. 6, shown is a flowchart of processing steps of a third embodiment that may be executed by the user computer 12 in connection with the techniques described herein for performing memory diagnostics. The flowchart 250 of FIG. 6 illustrates another automated invocation technique in which memory diagnostic processing may be executed as a background task when resources of the user computer are available or not in use by other tasks. The background task may be loaded as part of initialization processing of the user computer 12 and may execute continually while the user computer 12 is running, or until otherwise unloaded by a user. At step 252, a determination is made as to whether there are sufficient resources, such as CPU availability, to execute the memory diagnostic processing as a background task. If not, control proceeds to step 256 where execution of memory diagnostic processing is suspended until step 252 determines that sufficient resources are available. If step 252 determines that sufficient resources are available to execute the memory diagnostics, control proceeds to step 254 to execute the memory diagnostic processing as a background task. The memory diagnostic processing performed at step 254 may be performed as a result of invoking the diagnostic application, as mentioned above. Control proceeds to step 252 where the memory diagnostic processing may continue to execute until there are insufficient resources to execute the memory diagnostics. As will be appreciated by those skilled in the art, the resource levels may be deemed insufficient to execute the memory diagnostics as a background task, for example, in the event that an application program begins execution and utilizes a large percentage of the available CPU cycles for execution. As such, the operation of the background task for performing memory diagnostics is interrupted so that the application program may execute.

Figure 7:
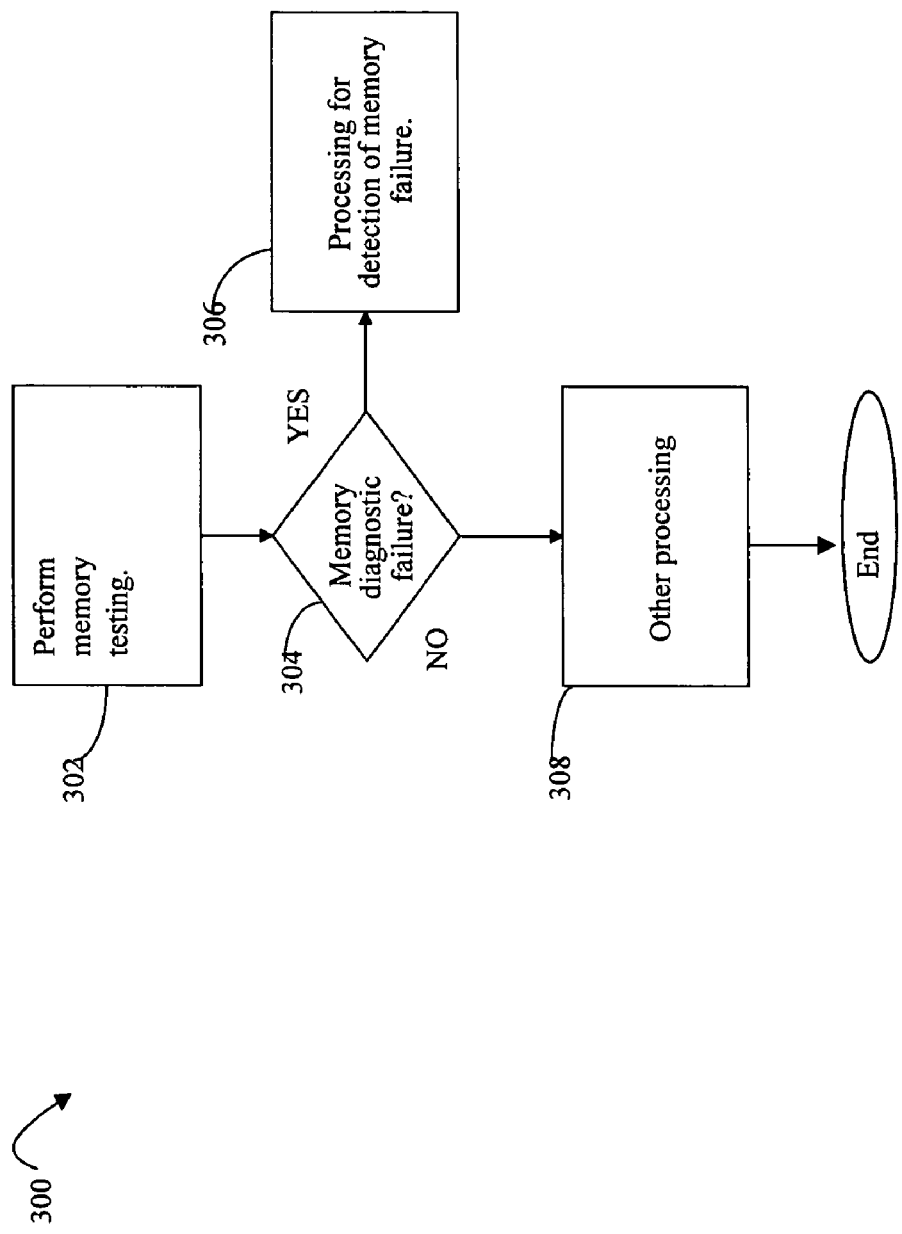
FIG. 7 is a flowchart of processing steps that may be performed by an embodiment of the diagnostic application.

Referring now to FIG. 7, shown is a flowchart of processing steps that may be performed by an embodiment of the diagnostic application. The steps of flowchart 300 of FIG. 7 illustrate more detailed processing as may be associated with performing step 156 of FIG. 4, step 208 of FIG. 5, and step 254 of FIG. 6. It should be noted that an embodiment of the diagnostic application may perform one or more types of diagnostics of which one is memory diagnostic processing. At step 302, memory testing is performed. Step 302 may include, for example, performing any one or more different types of memory tests, recording information about the execution thereof, and the like. A more detailed description of the processing of step 302 is described elsewhere herein. At step 304, a determination is made as to whether the memory testing indicates a failure. If so, control proceeds to step 306 to perform processing in accordance with the detection of a memory failure. Step 306 processing may include, for example, logging an error condition and status, outputting one or more messages to an output display to a user, and the like. In one embodiment, if memory testing indicates an error, one or more other tools may be invoked to confirm the existence of a memory problem. In other words, once the techniques described herein detect a problem with system memory, another third-party product may be used to confirm the memory problem in order to reduce the reporting of any failed memory when the memory tested is actually healthy. Otherwise, if step 304 does not result in the determination of a memory failure as may be indicated by a failure of one or more of the tests executed as described elsewhere herein, control proceeds to step 308 to perform other processing. Step 308 processing may include, for example, performing other diagnostics in the event that an embodiment includes the memory diagnostic processing as one of multiple diagnostics that may be performed.

It should be noted that the diagnostic application may perform additional processing operations and steps than as illustrated in FIG. 7. For example, the diagnostic application may output information to a user on a display panel at various times while performing the one or more diagnostics related to, for example, status information about which diagnostic is being executed, whether a failure has been detected, and the like.

Once an embodiment utilizing the techniques described herein detects a problem with the memory, one or more other third party tools and/or other processing may be performed to confirm the detection of a memory problem. This is described, for example, in connection with step 306 of FIG. 7 as may be included in an embodiment.

Figure 8:
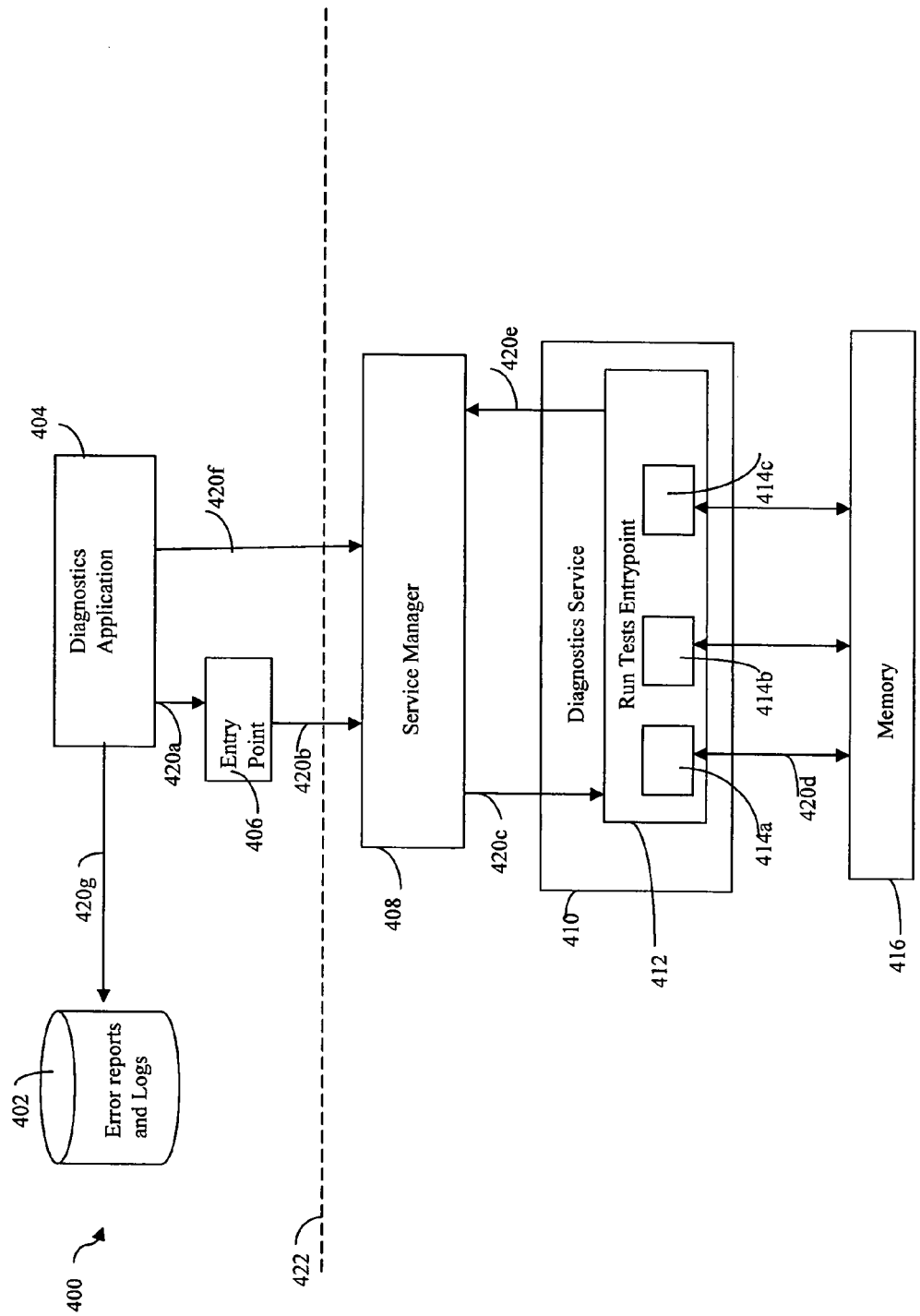
FIG. 8 is an example of a data flow diagram illustrating in more detail the techniques described herein for memory diagnostic testing in an embodiment.

Referring now to FIG. 8, shown is an example of a data flow diagram illustrating in more detail the techniques described herein for memory diagnostic testing as may be included in an embodiment. The diagnostic application 404 of FIG. 8 may be invoked as a result of any one or more automatic and/or manual techniques as may be included in an embodiment. For example, the processing illustrated by 400 of FIG. 8 may be utilized in combination with the techniques of FIGS. 3 and 4, FIG. 5, or FIG. 6. As described above, the diagnostics application 404 may control and initiate execution of one or more diagnostics, including the memory diagnostics.

In connection with FIG. 8, it should be noted that components included above line 422 run with "user" level privileges, and components below the line 422 run as "local system" or other mode with system level privileges. Other embodiments may have other defined modes of execution other than "user" and "local system" as described herein. The system level privileges may be characterized as having an elevated or privileged execution status, for example, in comparison to executing with user level privileges. When a service executes as "local system" with system level privileges, the service may have full control over the user computer 12.

Once invoked, the diagnostics application 404 may facilitate determination of the entry point 406 associated with the requested memory diagnostic service (as indicated by 420a). A call is then initiated (as indicated by 420b) to the service manager 408. The service manager 408 starts execution of the diagnostics service 410 (as indicated by 420c) to test memory. The diagnostics service 410 handles the allocation and testing of memory. In accordance with techniques as will be described in more detail herein, the diagnostic service 410 may utilize existing operating system functionality to lock memory. Recall that, as described herein, this locking functionality and testing is with respect to portions of physical memory. The memory may then be tested by executing (as indicated by 420d) one or more categories of tests 414a-414c. While the memory tests are executing, the diagnostic service 410 updates (as indicated by 420e) the service manager 408 with memory diagnostic status information. Such information may include, for example, what category of tests is being executed, which testing category experienced a failure, and the like. The diagnostics application 404 may query (as indicated by 420f) the service manager 408 for reporting status information at periodic intervals. Data may be written out (as indicated by 420g) to one or more logs. Such data may include information regarding the memory testing status and/or error information, and the like.

The techniques described herein and as further illustrated in FIG. 8 test memory using actions initiated by code (the diagnostics application) executing with user level privileges, and without requiring exclusive use of the user computer. Other applications may also continue execution. The memory testing techniques described herein lock physical memory utilizing a set of operating system supplied APIs (Application Programming Interfaces) to request and lock portions of physical memory. These APIs may be invoked by the diagnostic service executing as "local system" or other mode with system level privileges to perform this operation.

It should be noted that the techniques described herein for performing memory diagnostics may test different portions and components of memory on the user computer 12. Using the techniques described herein, main RAM can be tested as well as other forms of computer memory including, for example, SDRAM, DDRAM. The techniques described herein may not be suitable for testing some memory components, such as video RAM, printer RAM, or other forms as may be associated with a peripheral device. All of the available memory in the user computer may not be tested using the techniques described herein. Portions of the memory may be inaccessible since these portions, for example, may be reserved for use by the operating system or other applications. The particular portions of memory capable of being tested utilizing the techniques described herein may vary with embodiment.

A request may be made for an initial amount of memory to be locked and tested. This request may be refused, for example, if the initial amount requested is unavailable for use as may be the case if the memory is in use by other applications. If the initial request is refused, one or more subsequent requests for smaller portions can be successively made. Each successive request may be, for example, ½ the size of the previously requested amount. The process of repeatedly making a request to lock a memory portion may be repeated until either the memory request is granted, or the requested amount is at, or below, some threshold such as, for example 50 MBytes. The threshold may represent, for example, a minimum amount of memory for which memory diagnostics may be performed. For amounts below this threshold, it may be determined that memory diagnostic testing is not deemed worthwhile. The threshold and amounts of memory requested may vary with each system. Additionally, the techniques used in determining the size of the initial and any successive smaller requests may also vary with each embodiment. For example, in one embodiment, the initial amount of memory may be determined using two system parameters, the total amount of memory available and a percentage value. One or both of these values may be communicated via a command line, a configuration file available locally on the user system, or otherwise obtained from another system using a network or other connection to the user system. In the event that such values are not specified or otherwise unavailable, default values may be used. Additionally, an embodiment may include functionality so that any one or more values used in connection with determining an amount of memory to request may be modified. Values may also be obtained using a system call or other technique as provided in an embodiment.

In one embodiment, upper limits or maximum sizes may also be utilized in connection with the one or more parameters used to specify an initial request size. For example, in one embodiment, code included in the diagnostic service may perform a check so that no initial request is made for a portion of memory having a size, which exceeds more than 85% of all available memory, or more than an absolute value, such as 300 Mbytes. In the event that the one or more parameters specify a memory request size larger than one or more upper limit designations, the diagnostic service may stop processing and return an appropriate error status.

An embodiment may also perform multiple memory requests rather than a single memory request. Using the techniques described herein, an embodiment may make a single request for memory and perform diagnostic testing on that portion. Subsequently, a second request for additional memory may be made. This second request may be made in the event that the maximum amount desired is not initially allocated. For example, an initial request may be made for 85% of available memory. It may be that the request is denied because 25% of available memory is being used for other tasks at the time the initial request is made. A successive request for 40% of the memory may be made and allocated. Testing of 40% of the memory may be performed. Subsequently additional memory may become available. While retaining the lock on the initially requested 40% of memory, a second request for an additional portion of memory, such as 45% of memory, may be made. The second request for the additional 45% may now be granted since the additional memory is available. The additional 45% of memory may be tested. Subsequently the diagnostic service may now return the allocated and locked 85% of memory.

It should be noted that an embodiment may elect to only make a single memory request rather than multiple requests in order to minimize any undesired adverse effects on other executing application programs.

Figure 9:
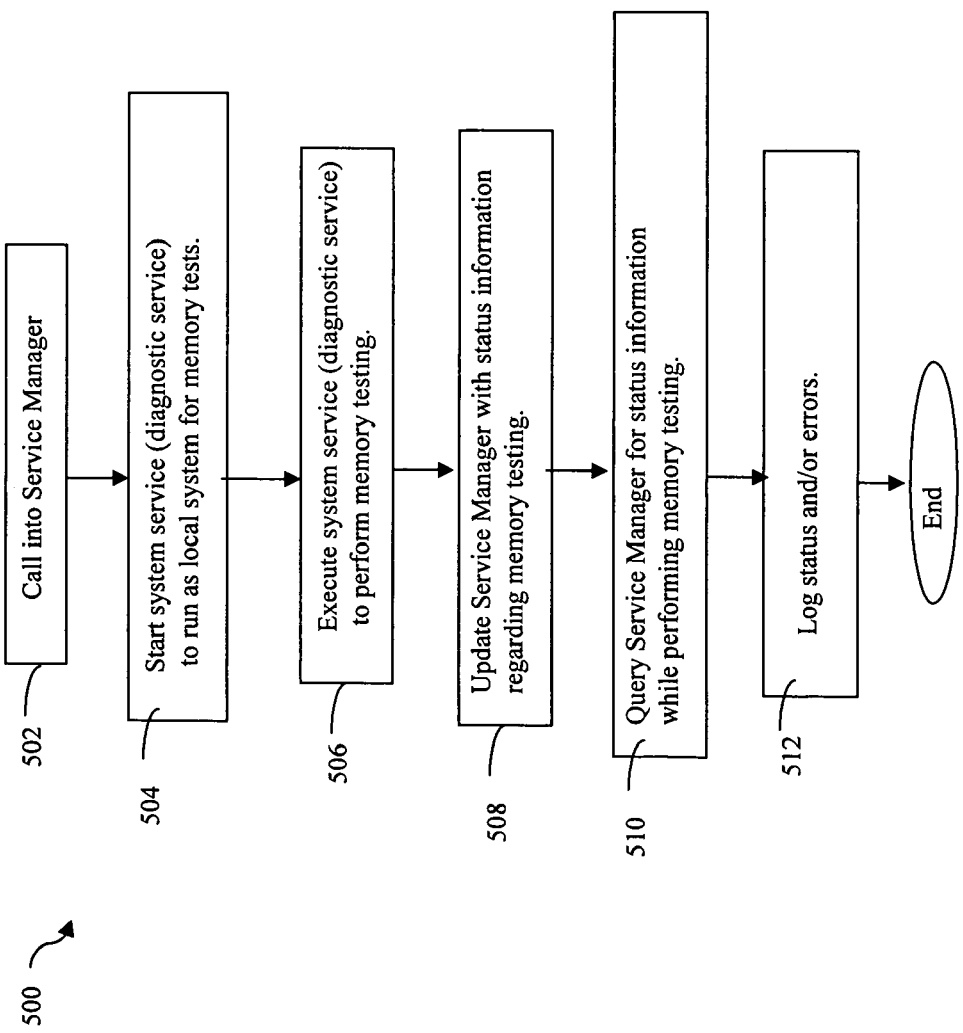
FIG. 9 is a flowchart of processing steps that may be performed in an embodiment connection with performing memory diagnostics utilizing components of FIG. 8.

Referring now to FIG. 9, shown is a flowchart of processing steps that may be performed in connection with performing memory diagnostics. The steps of flowchart 500 of FIG. 9 summarize the processing just described above in connection with FIG. 8. At step 502, there is a call into the service manager executing as local system or other mode with system level privileges. As described in connection with FIG. 8, one way in which this call may be initiated is using the diagnostic application just described. At step 504, the diagnostic service is started to run as local system. At step 506, the memory tests are executed as part of the processing performed by the diagnostic service. At step 508, the service manager is updated by the diagnostic service with status information while the memory tests are being performed. At various times, the service manager may be queried, such as by a component included in the diagnostic application executing with user level privileges, to obtain memory testing status information. At step 512, information regarding the memory testing, such as error and other status information, may be written out to the one or more logs as well as to a screen display providing status information to a user.

Figure 10:
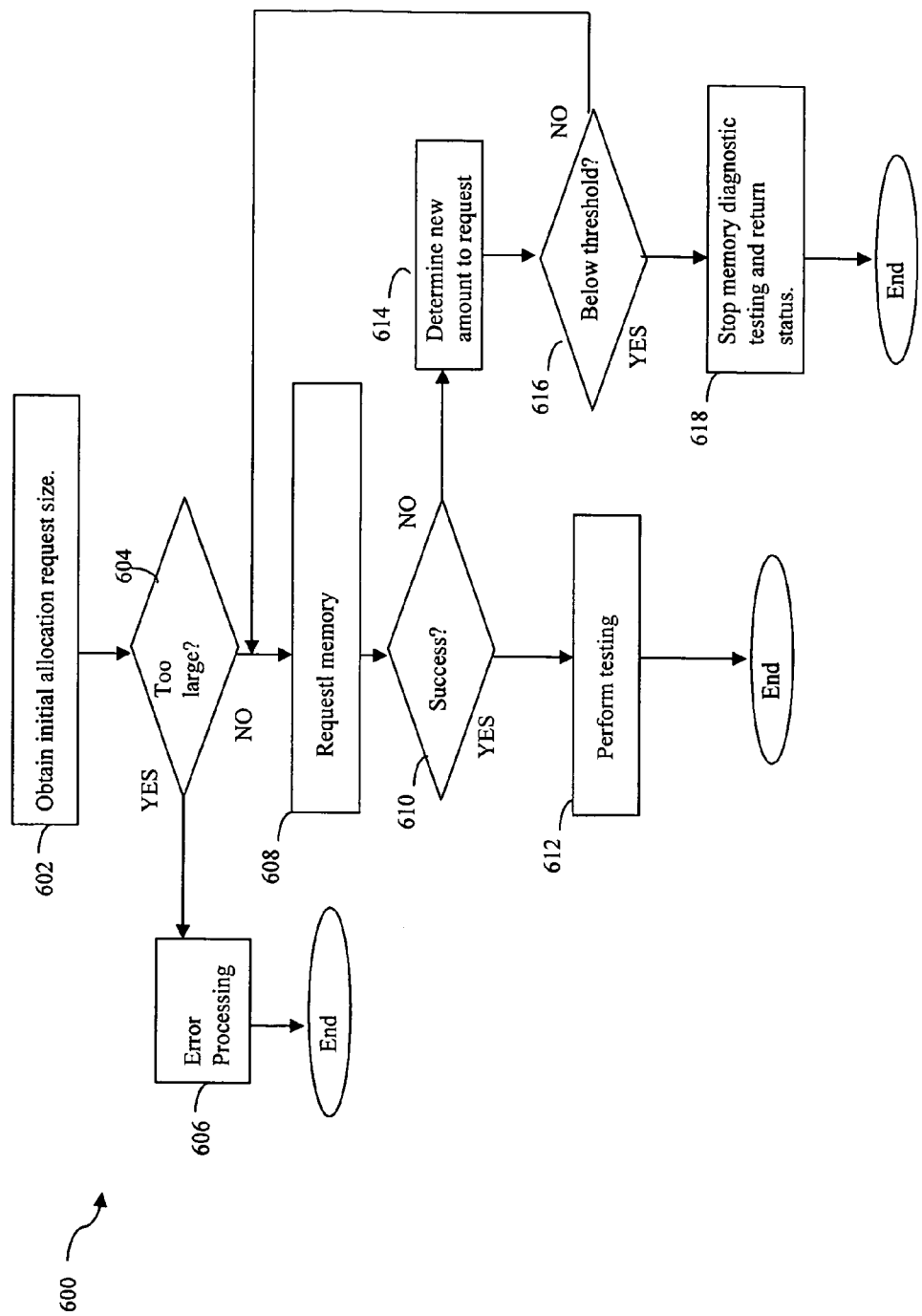
FIG. 10 is a flowchart of processing steps of one embodiment as may be performed by the diagnostic service testing memory.

Referring now to FIG. 10, shown is a flowchart of processing steps of one embodiment as may be performed by the diagnostic service running as "local system" or other mode with system level privileges in connection with testing memory. The steps of flowchart 600 set forth more detailed processing as may be performed in connection with step 506 of FIG. 9. Flowchart 600 includes processing in which one or more attempts are made to lock a portion of memory by making corresponding requests. Each of these requests may be made using functionality included in an embodiment of the operating system utilizing defined APIs. At step 602, an initial allocation request size is obtained. More detailed processing steps of how this initial allocation may be determined in an embodiment are described in connection with FIG. 11. At step 604, a determination is made as to whether this initial allocation is too large. Step 604 may determine that an initial allocation is too large in accordance with one or more threshold maximum values. Examples of these values are a percentage of memory, such as 85%, or an absolute maximum size, such as 300 Mbytes, as described above. It step 604 determines that the initial request is too large, control proceeds to step 606 for error processing. Otherwise, control proceeds to step 608 where the request for the memory amount is made. Successful execution of step 608 results in allocating and locking the requested amount of memory. If step 610 determines that the request to lock the requested portion of memory was successful, control proceeds to step 612 to run the memory tests. Additional detail that may be performed in an embodiment in connection with step 612 processing is described in connection with FIG. 12. If step 610 determines that the request for memory was not successful, control proceeds to step 614 to determine a new amount to request. The memory request may not be successful, for example, if the requested amount is currently in use by another application. As described above, any one of a variety of different techniques may be used to determine successive request sizes which are smaller than previously requested portions. One technique makes a next request ½ the size of a previously unsuccessful request. Once this new amount or size is determined at step 614, a determination is made at step 616 as to whether the new amount is too small, such as smaller than a minimum threshold size. If so, control proceeds to step 618 to stop memory diagnostic testing and return a corresponding status. If step 616 determines that the new amount at step 614 is not below the minimum threshold, control proceeds to step 608 to request the memory in accordance with the new amount. Subsequent requests for smaller amounts of memory may continue to be made until either the requested amount is smaller than the minimum threshold, or one of the requests is successful.

Figure 11:
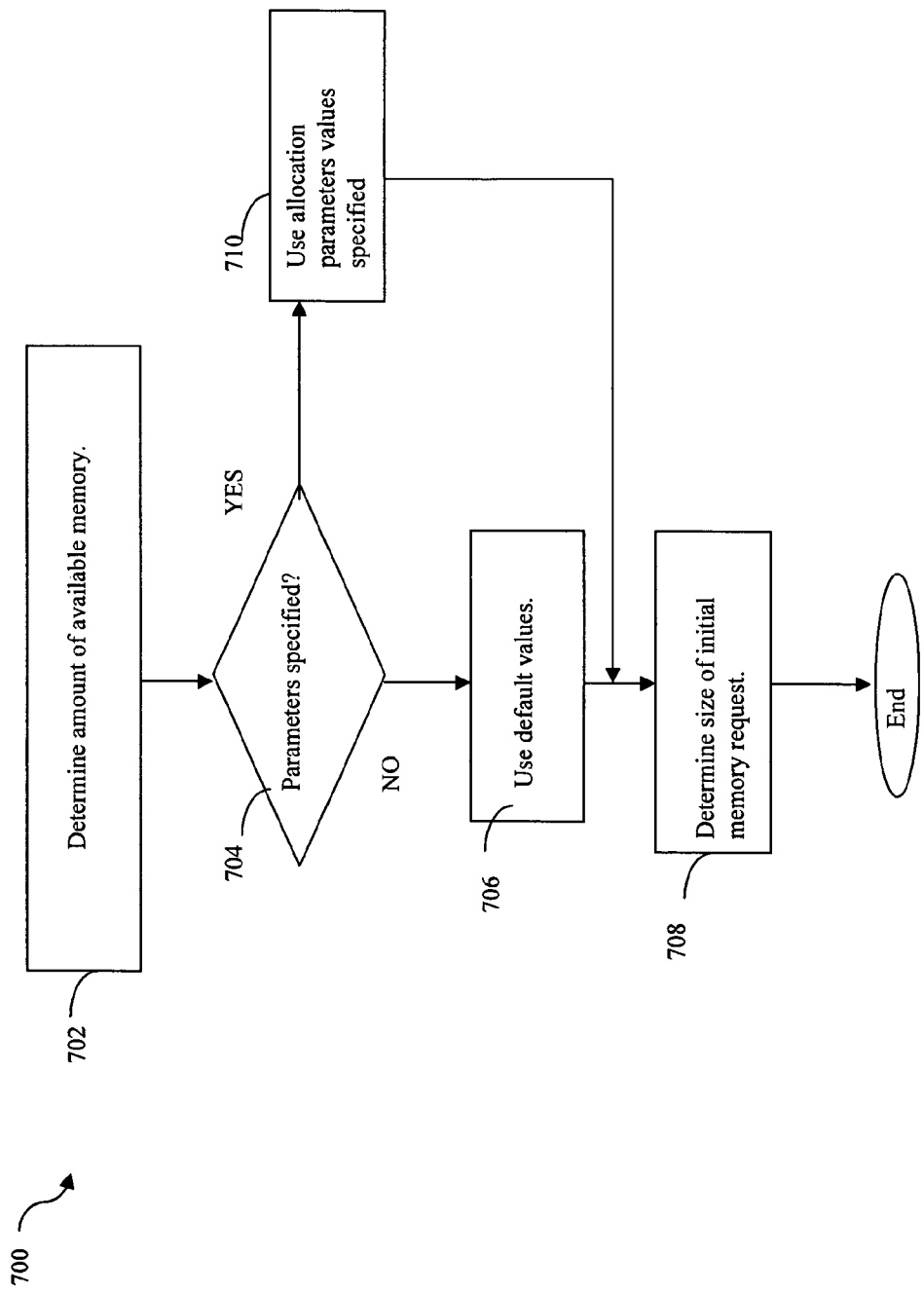
FIG. 11 is a flowchart of processing steps of one embodiment as may be performed to determine an initial amount of memory to request.

Referring now to FIG. 11, shown is a flowchart of processing steps of one embodiment as may be performed to determine an initial amount of memory to request. Flowchart 700 describes more detailed processing as may be performed in an embodiment in connection with step 602 of FIG. 10. At step 702, the amount of available memory in the user computer is determined. This may be the total amount of memory included in for use in the user computer. This amount may be obtained using functionality included in an embodiment such as, for example, using an API, system parameter, and the like. The size of the initial request may be determined in accordance with one or more parameters. In one embodiment, the initial amount may be determined as the smaller of: an initial request size in Mbytes (megabytes), or as a percentage of available memory. Values for these parameters may be specified using, for example, configuration or environment parameters, or included in a file periodically downloaded from the reporting computer. If values for these parameters are specified, as determined in step 704, control proceeds to step 710 to use these parameter values in connection with the initial allocation request. Control then proceeds to step 708. Otherwise, if step 704 determines that values for these parameters are not specified, control proceeds to step 706 where default system defined values may be used. At step 708, the size of the initial memory request is determined in accordance with the one or more parameters. It should be noted that the size may be determined in accordance with multiple values using a more complex formula than as described herein.

Figure 12:
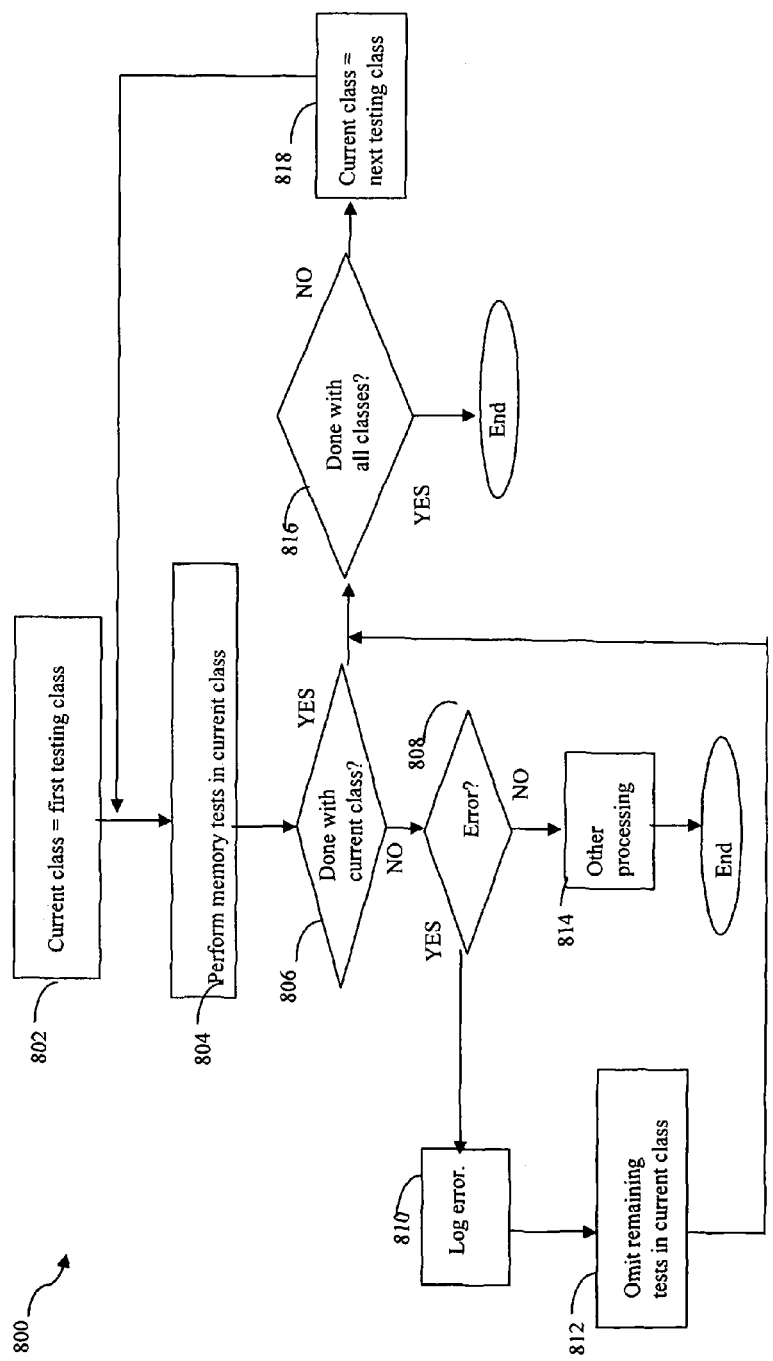
FIG. 12 is a flowchart of processing steps of one embodiment as may be performed to run memory tests.

Referring now to FIG. 12, shown is a flowchart of processing steps of one embodiment as may be performed to run memory tests. Flowchart 800 describes more detailed processing as may be performed in an embodiment in connection with step 612 of FIG. 10. The diagnostic service in one embodiment described herein may run different classes of memory tests as known to those of skill in the art. When executing tests of a single class, an embodiment may choose to omit execution of any remaining tests in the single class once a failure in that class has occurred. Alternatively, an embodiment may choose to continue execution of any remaining tests in a class once a failure in the class has occurred. It should be noted that although the flowchart 800 sets forth processing steps describing the former technique (i.e., omit remaining tests in class upon occurrence of first failure), an embodiment may also utilize the latter test processing (i.e., continue execution of all tests in class even upon the occurrence of a test failure in that class. At step 802, the current testing class is defined as the first testing class. At step 804, memory tests for the current class are performed until either all tests in the class have been processed, or an error has occurred with a test. Thus, step 806 is reached when either of these two conditions has occurred. Step 806 determines whether processing for the current test class is complete. If so, control proceeds to step 816 where a determination is made as to whether all testing classes have been processed. If so, testing is complete. Otherwise, control proceeds to step 818 where testing proceeds with the next class by assigning current class the next testing class. Control proceeds to step 804 to resume testing with the next class.

If step 806 determines that processing is not complete for the current class, control proceeds to step 808 to determine if an error in testing has occurred. If so, control proceeds to step 810 to log and/or report the error. Such processing associated with step 810 may include, for example, reporting to the service manager regarding the test failure status for the current class. Control proceeds from step 810 to step 812 where any remaining tests in the current class may be omitted. Control then proceeds to step 816. If step 808 determines that no error has occurred, control proceeds to step 814 where other processing occurs, for example, to handle this unexpected termination of testing of the current class.

It should be noted that although particular modes, such as "user" with user level privileges and "local system" with system level privileges, are described herein, an embodiment may utilize other designations having the appropriate privileged attributes needed to perform the techniques described herein. For example, one privilege used in connection with the techniques described herein as provided by "local system" mode or system level privilege mode is the capability to lock memory. Other embodiments may associate this capability with other modes.

The foregoing describes memory diagnostic techniques as may be included as one of a set of diagnostics. These diagnostics may be invoked in any one or more different ways. In one embodiment described herein, the memory diagnostics may be performed in response to a software application which is experiencing abnormal, unexpected or undesirable behavior as part of processing attempting to diagnose the cause for such behavior. The diagnostics may be triggered in response to, for example, users experiencing a predetermined level of such undesirable behavior. The undesirable behavior may include the occurrence of certain threshold levels of events such as, for example, abnormal program operations including program crashes and program hangings. If the memory diagnostics indicate there is a problem with the memory, a diagnostic message conveying this may be displayed on a user interface. Otherwise, if the memory diagnostic processing does not indicate a problem with the memory, other diagnostics may be performed in an attempt to isolate other possible hardware and/or software problems. Depending on the diagnostic results, processing may be performed to attempt to automatically correct a detected problem. If the diagnostics do not successfully analyze or diagnose a recurrent problem, the user may be directed to other specialized product support.

An embodiment using the techniques herein may include one or more diagnostics in addition to the memory diagnostics. An embodiment including multiple diagnostics may also include user configuration values or setting so that a user can select which one or more diagnostics are to be performed when diagnostic processing is invoked. As described herein, the memory diagnostics, alone or in conjunction with other diagnostics, may also be invoked manually by a user running a diagnostic application, automatically by the operating system in which the memory diagnostics are performed as a background task, or automatically in accordance with one or more heuristics.

The techniques described herein utilize existing operating system functionality to lock memory, referring herein to physical memory, before testing. The memory diagnostic runs inside a system service executing as local system or other system level privilege mode. The request for the system service may be initiated by an application executing with user level privileges. In connection with normal memory operations as may be performed by an application executing with user level privileges, virtual memory management techniques may be utilized. As known to those skilled in the art, virtual memory management utilizes virtual memory accesses representing a mapped version of physical memory. However, in order to perform memory diagnostics on physical memory, control over physical memory is exercised using the techniques herein without virtual memory management which can cause unwanted side effects when running memory diagnostics. For example, the memory mapping performed in connection with virtual memory management can change dynamically such as in connection with swapping out a first task, such as a memory test, to allow another task of a higher priority to execute. In other words, virtual memory management may not provide the desired level of control over physical memory needed in order to perform the memory diagnostics. Additionally, errors may be detected during the memory diagnostic testing which are caused by the swapping out operation. For example, if the test being executed is swapped out to a disk or other device, there may be a problem with that device location to which the swapped-out test is stored. Subsequently, when the test is swapped back into physical memory, an error may be introduced. Such an error may be falsely attributed to the memory rather than the actual device or other cause associated with the swapping out operation. Further, rather than introduce an error, the swap out process may mask a problem by inadvertently correcting a problem introduced by a memory error.

The techniques described herein execute the memory diagnostic as a system service running in "local system" mode or with system level privileges able to lock portions of memory (i.e., the physical memory). Since such code executing in the elevated privilege may pose security risks, an embodiment may take certain steps to reduce security risks. As a first measure, the diagnostic service locking the memory may be configured so that only an administrator or account with certain elevated privileges can start the diagnostic service. More specifically, the diagnostic service may be initiated from user level, but the diagnostic service runs under a high privilege level account, such as one with system level privileges, once initiated. When the diagnostic service is installed, the required level of privileges or attributes may be specified. Subsequently, attempts to invoke the service without the specified privileges will fail as enforced by the operating system. An embodiment may enforce this, for example, by utilizing an access control list, or other equivalent, in connection with the user requesting the service. As a second security measure, an embodiment may allow only one instance of the diagnostic service to execute at any time on a single computer. As a third security measure, the functionality performed by the diagnostic service may be limited. In other words, an embodiment may partition functionality performed by various modules so that the diagnostic service executing in the elevated "local system" or other system level privilege mode performs only its intended task of testing memory. As a fourth security measure, an embodiment may install the service so that its execution cannot be initiated remotely, such as over a network except by administrators. An embodiment may require that one or more command line parameters be correctly specified in connection with invocation of the service in order to prevent accidental execution of the memory diagnostic. Otherwise, an embodiment of the service may neither lock memory nor run tests. The foregoing security measures may be performed in an embodiment as preventive measures to reduce the possibility of attackers compromising the system and, if compromised, to limit potential damage that may be inflicted to a system. An embodiment may utilize one or more of the foregoing techniques alone, or in combination with, others that may vary with each system.

In connection with the techniques described herein which may be invoked when an application crashes, an embodiment may attempt to restart the application prior to completing the memory diagnostic or other diagnostic testing. Alternatively, an embodiment may also purposefully not execute all, or a portion of, the applications which may have crashed or otherwise abnormally terminated until memory diagnostic testing is complete in order to increase the amount of memory available for locking and testing using the techniques described herein.

It should be noted that memory diagnostic testing as performed herein may be used to perform a limited amount of memory testing in accordance with parameters, thresholds, and the like, as may be specified for an embodiment. For example, using the techniques described herein, testing may not be performed on portions of memory used in connection with caching. Additionally, the upper limits indicating the maximum amount of memory that can be requested may specify less than all of memory. As a result, the techniques herein may be used in running memory diagnostics which may not guarantee testing all memory. However, the techniques described herein may be performed in an automated and/or manual fashion without disabling execution of other user applications and without requiring rebooting of an affected computer system.

An embodiment utilizing the diagnostic processing techniques described herein may include a user cancellation option which provides the user with the control to stop memory diagnostic processing. Such functionality may be included via a user interface or other option that may vary with embodiment.

An embodiment of the diagnostic application may provide user feedback regarding the progress of memory testing, for example, using a progress bar which is periodically updated by the application when information is obtained from the service manager regarding testing progress and status.

It should be noted that the actual memory tests executed may vary with each embodiment and are well known to those of skill in the art. For example, memory tests may be performed to detect different types of memory errors such as a straight error (e.g., a bit is locked to a fixed value of either 0 or 1), an inverse error (e.g., a bit setting is written which is the opposite of what was intended—operations to write a 0 and a 1 is written), a timing error (e.g., after a certain time period, some bit settings will decay to 0 because power is not sustained), or a coupling error (e.g., writing to certain locations impacts other locations).

An embodiment utilizing the techniques described herein may perform memory testing for some defined maximum time period. After that time period, memory testing may be automatically terminated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing memory diagnostics comprising:
based upon examination of program termination data, initiating memory diagnostics from a first program having user level privileges;
locking a portion of physical memory to be tested using functionality included in an operating system by a second program having system level privileges, the system level privileges provide for a privileged execution state in comparison to the first program having user level privileges, wherein said second program is a system service that can only be executed from an account having administrative privileges;
executing at least one memory diagnostic test on said portion locked by the second program having system privileges producing a result by the second program; and
determining, in accordance with said result, whether a memory problem exists for said portion by the second program.

2. The method of claim 1, wherein said locking includes making at least one call using an application programming interface.

3. The method of claim 1, further comprising:
communicating at least one of said result or testing progress information from said second program to said first program.

4. The method of claim 1, wherein execution of said first program is manually initiated by a user.

5. The method of claim 1, wherein execution of said first program is automatically initiated in accordance with at least one heuristic associated with a memory failure.

6. The method of claim 5, wherein said at least one heuristic includes a threshold value indicating a number of abnormal program terminations.

7. The method of claim 5, wherein said at least one heuristic includes at least one characteristic associated with an abnormal program termination.

8. The method of claim 5, further comprising:
examining termination data associated with at least one previous program execution in accordance with said at least one heuristic.

9. The method of claim 1, wherein execution of said first program is automatically initiated by an exception handler handling an abnormal termination of a third program executing in said first execution mode.

10. The method of claim 1, wherein said first program executes as a background task.

11. The method of claim 1, wherein said system service performs only processing associated with performing memory diagnostics.

12. The method of claim 1, wherein execution of said system service cannot be initiated remotely by an unauthorized user.

13. The method of claim 1, wherein the portion of physical memory comprises random access memory.

14. A computer storage medium having computer executable instructions stored thereon for performing steps comprising:
invoking a system service executing in a first execution mode with a first set of privileges, said system service locking a portion of physical memory to be tested using functionality included in an operating system, and executing at least one memory diagnostic test on said portion locked by said system service producing a result, wherein said first execution mode comprises system level privileges, the system level privileges provide for a privileged execution state in comparison to a second execution mode having user level privileges; and
determining, in accordance with said result, whether a memory problem exists for said portion.

15. The computer storage medium of claim 14, wherein said system service is initiated by a program executing in the second execution mode that is different from said first execution mode and has insufficient privileges to perform said locking.

16. The computer storage medium of claim 15, wherein said system service is installed and architected in accordance with at least one security measure.

17. A system for performing memory diagnostics comprising:
- a user computer upon which said memory diagnostics are performed, said user computer operative to:
  - lock a portion of physical memory to be tested using functionality included in an operating system by a program having system level privileges;
  - execute at least one memory diagnostic test on said locked portion producing a result; and
  - determine, in accordance with said result, whether a memory problem exists for said portion; and wherein said user computer communicates information related to said memory diagnostics to a reporting computer.

18. The system of claim 17, wherein said user computer includes computer executable components comprising:
- a service manager component that manages services;
- a memory diagnostic service component which locks said portion of physical memory, initiates execution of said at least one memory diagnostic, and communicates said result to said service manager component;
- a diagnostics application component which communicates with said service manager component to initiate said memory diagnostic service component; and
- an operating system component which includes functionality utilized by said memory diagnostic service component in locking said portion of physical memory.

* * * * *